(12) United States Patent
Li (10) Patent No.: US 12,438,494 B2
(45) Date of Patent: Oct. 7, 2025

(54) POWER TOOL

(71) Applicant: Nanjing Chervon Industry Co., Ltd., Nanjing (CN)

(72) Inventor: Guang Li, Nanjing (CN)

(73) Assignee: Nanjing Chervon Industry Co., Ltd., Nanjing (CN)

( * ) Notice: Subject to any disclaimer, the term of this patent is extended or adjusted under 35 U.S.C. 154(b) by 371 days.

(21) Appl. No.: 17/695,925

(22) Filed: Mar. 16, 2022

(65) Prior Publication Data

US 2022/0329197 A1    Oct. 13, 2022

(30) Foreign Application Priority Data

Apr. 7, 2021 (CN) .......................... 202110371026.7

(51) Int. Cl.
*H02H 1/06* (2006.01)
*H02K 7/14* (2006.01)
(Continued)

(52) U.S. Cl.
CPC .............. *H02P 29/68* (2016.02); *H02K 7/145* (2013.01); *H02K 11/33* (2016.01); *H02P 25/03* (2016.02); *H02P 27/08* (2013.01)

(58) Field of Classification Search
CPC ..................................... H02P 6/28; H02P 9/14
See application file for complete search history.

(56) References Cited

U.S. PATENT DOCUMENTS 8,076,873 B1 * 12/2011 Lucas ....................... H02P 1/54
318/108
2007/0267990 A1    11/2007 Abolhassani
(Continued)

FOREIGN PATENT DOCUMENTS

CN    101542892 A    9/2013
CN    104518730 A    4/2015
(Continued)

OTHER PUBLICATIONS

EPO, extended European Search Report issued on European patent publication No. 4070917A1, dated Sep. 6, 2022, 8 pages.
(Continued)

*Primary Examiner* — Kawing Chan
*Assistant Examiner* — Charles S Laughlin
(74) *Attorney, Agent, or Firm* — Greenberg Traurig, LLP (57) ABSTRACT

A power tool includes a motor, a switch, a driver circuit, an operating element, and a controller. The motor includes a multi-phase winding. The driver circuit has multiple power elements and is configured to change a rotational state of the motor. The operating element has a first operating state and a second operating state, where a strength of an effective magnetic field of the multi-phase winding when the operating element is in the first operating state is less than a strength of an effective magnetic field of the multi-phase winding when the operating element is in the second operating state. The controller is configured to control conduction manners of the multiple power elements in the driver circuit according to an operating state of the operating element, so as to adjust the strength of the effective magnetic field of the multi-phase winding and change the rotational state of the motor.

18 Claims, 5 Drawing Sheets

(51) Int. Cl.
  *H02K 11/33*   (2016.01)
  *H02M 1/32*   (2007.01)
  *H02P 25/03*   (2016.01)
  *H02P 27/08*   (2006.01)
  *H02P 29/68*   (2016.01)

(56) References Cited

U.S. PATENT DOCUMENTS

| | | | |
|---|---|---|---|
| 2013/0049643 A1 | 2/2013 | Kusakawa | |
| 2013/0314007 A1* | 11/2013 | Yanagihara | H02P 6/28 |
| | | | 318/400.13 |
| 2014/0165525 A1 | 6/2014 | Nagata | |
| 2015/0159655 A1* | 6/2015 | Yano | F04C 18/06 |
| | | | 417/45 |
| 2016/0245288 A1* | 8/2016 | Yano | F04C 28/06 |
| 2018/0219498 A1* | 8/2018 | Iwata | B25F 5/00 |
| 2020/0343838 A1* | 10/2020 | Thrush | B25D 11/064 |
| 2022/0216746 A1* | 7/2022 | Yoneda | H02K 1/223 |

FOREIGN PATENT DOCUMENTS

| | | |
|---|---|---|
| CN | 207098286 U | 3/2018 |
| CN | 110572089 A | 12/2019 |
| CN | 109873578 A | 3/2023 |
| EP | 3687057 A1 | 10/2021 |
| WO | 2020217626 A1 | 10/2020 |

OTHER PUBLICATIONS

Office Action from EP application No. 22162355.6, dated Aug. 8, 2024, 6 pp.

* cited by examiner

POWER TOOL

RELATED APPLICATION INFORMATION

This application claims the benefit under 35 U.S.C. § 119(a) of Chinese Patent Application No. CN 202110371026.7, filed on Apr. 7, 2021, which application is incorporated herein by reference in its entirety.

BACKGROUND

Generally, an operating gear of a power tool may be gradually raised or lowered by adjusting an operating switch to satisfy requirements of a user or current operating condition requirements, but this adjustment has a certain process. For example, if the operating gear needs to be directly raised from a normal lower gear to a maximum gear, it is necessary to gradually raise the current operating gear; and if the operating gear needs to be lowered from the maximum gear to the normal operating gear, it is necessary to gradually adjust the switch to lower the gear, resulting in that adjustment requirements for the maximum gear have a certain process, that is, the response is not timely enough. In addition, if a target rotational speed of the tool is higher than a maximum rotational speed of the tool in the current gear, the target rotational speed cannot be reached, thereby failing to satisfy requirements of the user.

SUMMARY

A power tool includes a motor, a power supply, a switch, a driver circuit, an operating element, and a controller. The motor includes a multi-phase winding. The power supply is configured to power the motor. The switch is triggerable by a user and configured to switch a power on-off state of the power tool. The driver circuit has a plurality of power elements and is configured to change a rotational state of the motor. The operating element has a first operating state and a second operating state, where a strength of an effective magnetic field of the winding when the operating element is in the first operating state is less than a strength of an effective magnetic field of the winding when the operating element is in the second operating state. The controller is configured to control conduction manners of the plurality of power elements in the driver circuit according to an operating state of the operating element, so as to adjust the strength of the effective magnetic field of the winding and change the rotational state of the motor.

A power tool includes a motor, a power supply, a switch, a driver circuit, an operating element, and a controller. The motor includes a multi-phase winding. The power supply is configured to power the motor. The switch is triggerable by a user and configured to switch a power on-off state of the power tool. The driver circuit has a plurality of power elements and is configured to change a rotational state of the motor. The operating element has a first operating position and a second operating position, where a strength of an effective magnetic field of the winding in the motor when the operating element is in the first operating position is less than a strength of an effective magnetic field of the winding in the motor when the operating element is in the second operating position. The controller is configured to control conduction manners of the plurality of power elements in the driver circuit according to an operating position of the operating element, so as to adjust the strength of the effective magnetic field of the winding and change the rotational state of the motor.

A fastening power tool includes a motor, a power supply, a switch, a driver circuit, an operating element, and a controller. The motor includes a multi-phase winding. The power supply is configured to power the motor. The switch is triggerable by a user and configured to switch a power on-off state of the power tool. The driver circuit has a plurality of power elements and is configured to change a rotational state of the motor. The operating element has a first operating state and a second operating state, where a strength of an effective magnetic field of the winding when the operating element is in the first operating state is less than a strength of an effective magnetic field of the winding when the operating element is in the second operating state. The controller is configured to control conduction manners of the plurality of power elements in the driver circuit according to an operating state of the operating element, so as to adjust the strength of the effective magnetic field of the winding and change the rotational state of the motor.

A fastening power tool includes a motor, a power supply, a switch, a driver circuit, an operating element, and a controller. The motor includes a multi-phase winding. The power supply is configured to power the motor. The switch is triggerable by a user and configured to switch a power on-off state of the power tool. The driver circuit has a plurality of power elements and is configured to change a rotational state of the motor. The operating element has a first operating position and a second operating position, where a strength of an effective magnetic field of the winding in the motor when the operating element is in the first operating position is less than a strength of an effective magnetic field of the winding in the motor when the operating element is in the second operating position. The controller is configured to control conduction manners of the plurality of power elements in the driver circuit according to an operating position of the operating element, so as to adjust the strength of the effective magnetic field of the winding and change the rotational state of the motor.

DETAILED DESCRIPTION

The present disclosure is described hereinafter in detail in conjunction with drawings and examples. It is to be understood that the examples described herein are merely intended to explain the present disclosure and not to limit the present disclosure. Additionally, it is to be noted that for ease of description, only part, not all, of the structures related to the present disclosure are illustrated in the drawings.

Figure 1:
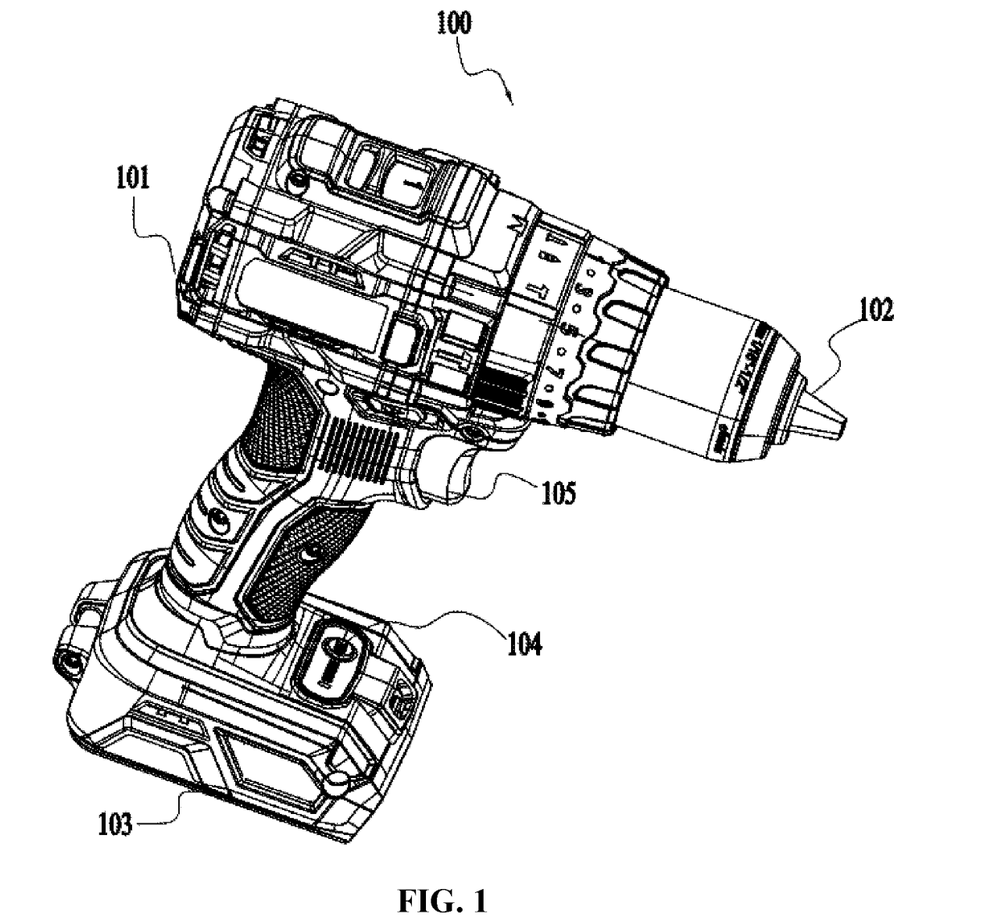
FIG. 1 is a structure view of a power tool according to an example of the present disclosure.

It is to be noted that the power tool in the present application may be any tool that can achieve two working states through an operating element, for example, a handheld tool with a Boost key, which can switch between a Boost state and a Normal mode of the tool through the Boost key. The operating element is the Boost key and may also be another type of element triggerable by a user, for example, a trigger, a knob or the like. As shown in FIG. 1, a power tool 100 in an example is a heavy-duty drill with a Boost key. A power tool 100 includes a housing 101, a drill bit 102, a battery pack 103, a Boost key 104, and a switch 105.

Figure 2:
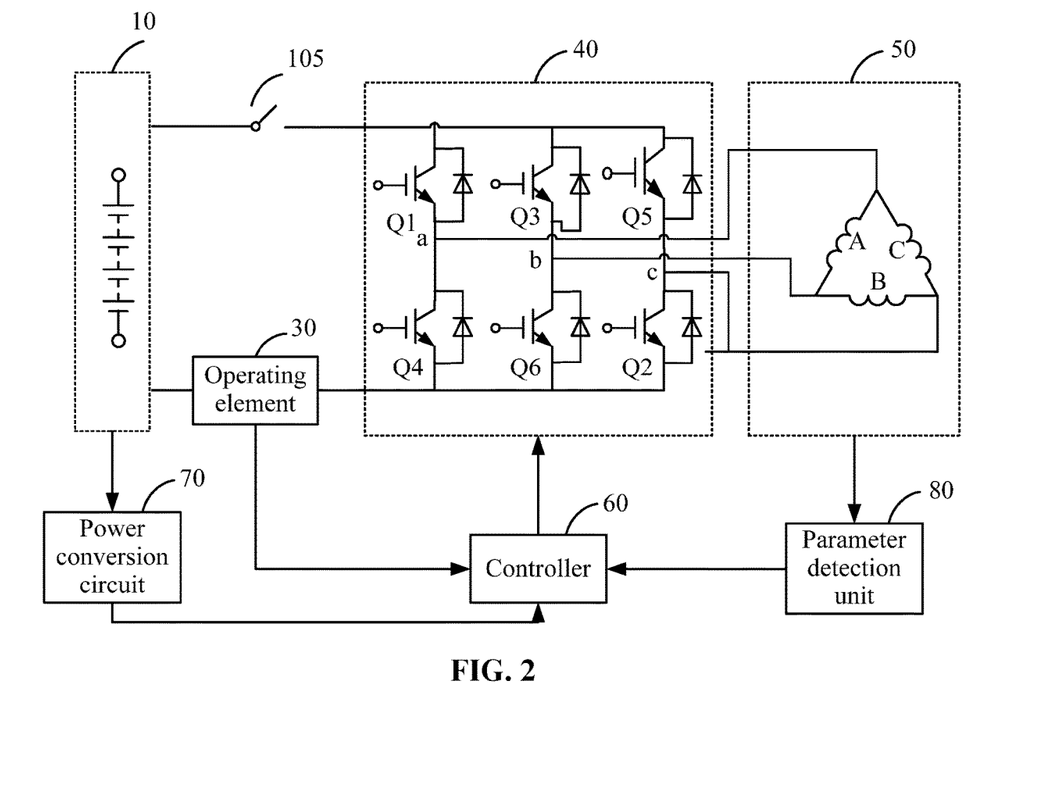
FIG. 2 is a circuit schematic of a power tool according to an example.

Referring to a circuit schematic of a power tool shown in FIG. 2, the power tool may include a power supply 10, a switch 105, an operating element 30, a driver circuit 40, a motor 50, a controller 60, a power conversion circuit 70, and a parameter detection unit 80. In an example, the motor 50 is a brushless motor.

In an example, the power supply 10 may be alternating current mains power. In an example, the power supply 10 may also be the battery pack 103 shown in FIG. 1. The battery pack may be composed of a set of battery cells. For example, the battery cells may be connected in series into a single power supply branch to form a 1P battery pack. The battery pack may also be composed of two or more sets of battery cells. Specifically, after a power supply voltage is converted by the power conversion circuit 70, the controller 60 can be powered on.

The switch 105 is connected to a power supply circuit of the power supply 10 and is triggerable by the user to achieve an on-off operation of the tool 100. Optionally, the switch 105 may be any form of switch, such as a key switch, a rotary switch, a trigger, or a touch screen switch.

The operating element 30 is connected between the power supply 10 and the controller 60 and has two operating states, that is, a first operating state and a second operating state. It is to be noted that the two operating states of the operating element 30 may be selected and triggered by the user. In an example, the operating element 30 is the Boost key 104 shown in FIG. 1, and the user may press the Boost key to make the operating element 30 in the first operating state or the second operating state. For example, the user presses the Boost key for the first time to make the operating element in the first operating state and presses the Boost key for the second time to make the operating element in the second operating state. In some examples, the operating element may be an electronic switch, a signal switch, a relay or the like. It is to be understood that when the operating element 30 is in the first operating state, the motor 50 has a first working state, and when the operating element 30 is in the second operating state, the motor 50 has a second working state. The motor 50 has different parameters such as rotational speeds and/or torques and/or power and/or strengths of effective magnetic fields of a winding under different working states. In the present application, a strength of an effective magnetic field of a winding in the motor 50 when the operating element 30 is in the first operating state is less than a strength of an effective magnetic field of the winding in the motor 50 when the operating element is in the second operating state.

In the present application, when the operating element 30 is in the first operating state, the motor 50 is in a Boost state, that is, a rotational speed of the motor 50 is a maximum rotational speed; while when the operating element 30 is in the second operating state, the motor 50 is in a Normal state, that is, the motor 50 is in a normal working mode, and the rotational speed of the motor 50 is less than the maximum rotational speed and can be adjusted. It is to be understood that, when the operating element 30 is in the first operating state, the motor 50 has a high rotational speed and heats up quickly so that an over-temperature protection function may be quickly triggered so as to shut down the power tool 100. Although the motor 50 may possibly be shut down due to an over-temperature protection when the operating element 30 is in the second operating state, a temperature threshold of the over-temperature protection when the operating element 30 is in the second operating state is lower than a temperature threshold of the motor over-temperature protection when the operating element 30 is in the first operating state. Therefore, if a power tool is shut down due to an over-temperature protection when an operating element is in a first operating state, it takes a relatively long time to cool down the power tool before the power tool can be started again, thereby affecting the total use time of the power tool and degrading user experience.

In an example, the controller 60 may control the motor 50 to automatically switch to the second working state when the operating element 30 is in the first operating state (that is, the motor 50 is in the first working state) and before the motor 50 triggers the over-temperature protection. It is to be understood that, when the motor 50 is in the second working state, the user may make the motor 50 enter the first working state again by triggering the operating element 30 again.

The driver circuit 40 is connected between the controller 60 and the motor 50 and includes multiple semiconductor power elements to switch an energized state of the motor 50. In an example, the driver circuit 40 is electrically connected to stator windings of phases of the motor 50 and configured to transmit power supply current to the stator windings to drive the motor 50 to rotate. As an example, as shown in FIG. 2, the driver circuit 40 includes multiple power elements Q1, Q2, Q3, Q4, Q5, and Q6. Gate terminals of the power elements are electrically connected to the controller 60 and configured to receive control signals from the controller 60. Drains or sources of the power elements are connected to the stator windings of the motor 50. The power elements Q1 to Q6 receive the control signals from the controller 60 to change respective conduction states, thereby changing current loaded on the stator windings of the brushless motor 50 by the power supply 10. In an example, the driver circuit 40 is a three-phase bridge driver circuit including six controllable semiconductor power devices (such as a field-effect transistor (FET), a bipolar junction transistor (BJT), and an insulated-gate bipolar transistor (IGBT)), and each of the power elements Q1 to Q6 is other types of solid-state switches (such as IGBT and BJT).

To make the motor 50 rotate, the driver circuit 40 has multiple driving states. In one driving state, the stator windings of the motor 50 generate a magnetic field, the controller 60 outputs a corresponding control signal to power elements in the driver circuit 40 according to a rotor position or a back electromotive force of the motor 50 in coordination with the operating state of the operating element 30 so that the driving state of the driver circuit 40 is switched and thus the stator windings generate a changing magnetic field to drive a rotor to rotate, thereby achieving the rotation or commutation of the motor 50. It is to be understood that the controller 60 needs to control a conduction manner of the driver circuit 40 according to the operating state of the operating element 30, so as to adjust the strength of the effective magnetic field of the winding in the motor 50, thereby being capable of changing a rotational state of the motor 50 to make the motor 50 work in the first working state or the second working state. It is to be noted that any other circuits and control methods capable of achieving the rotation or commutation of the motor 50 may be used in the present disclosure and the present disclosure does not limit a circuit structure of the driver circuit 40 and the control of the driver circuit 40 by the controller 60.

The parameter detection unit 80 may be configured to detect working parameters of the motor 50, for example, parameters such as a rotational speed of the motor, a rotor position, a phase current, or temperature. It is to be understood that the parameter detection unit 80 may be integrated with a variety of sensors to detect one or more of the preceding working parameters, for example, a sampling resistor and a temperature detection resistor.

In conjunction with FIG. 2, a description is given in detail in which the controller 60 controls conduction manners of the power elements in the driver circuit 40 according to the operating state of the operating element 30 to adjust the strength of the effective magnetic field of the winding in the motor 50, thereby changing the rotational state of the motor 50 to make the motor 50 work in a working state that matches the operating state of the operating element 30. It is to be noted that the first, the second, the third, and the fourth in the present application do not limit the order, but are only for naming distinction.

Figure 3A:
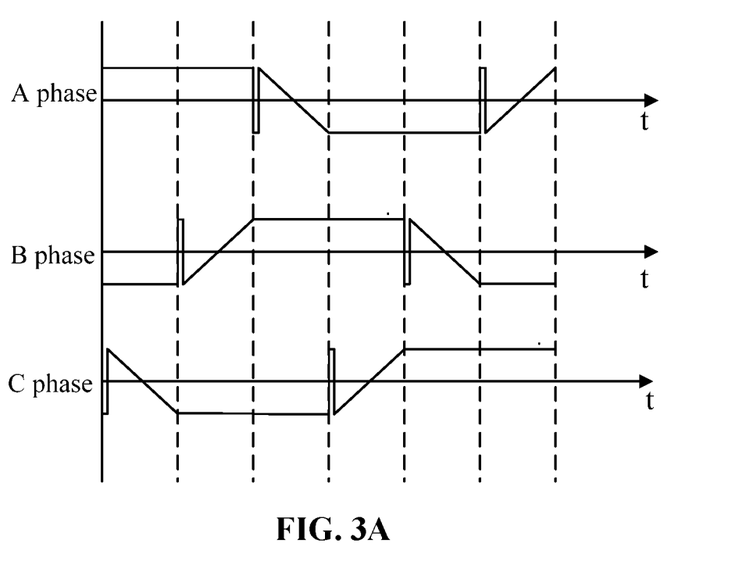
FIG. 3A is a schematic diagram of control waveforms when an operating element is in a second operating state.
Figure 3B:
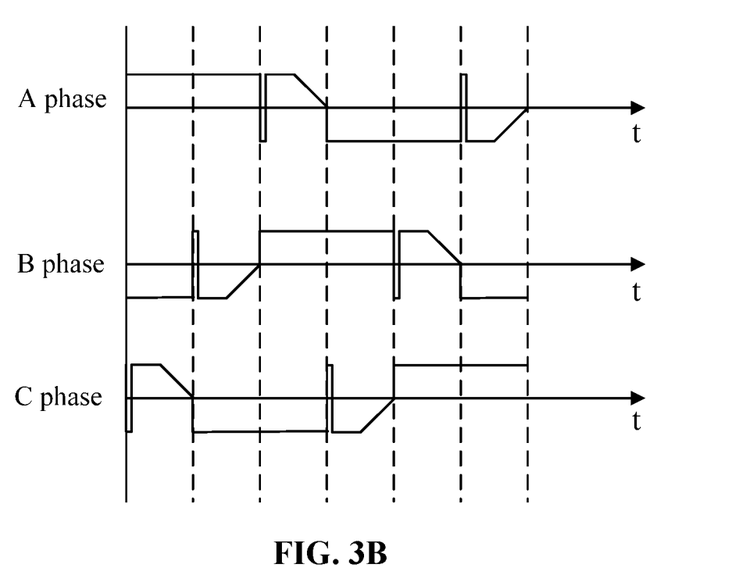
FIG. 3B is a schematic diagram of control waveforms when the operating element is in a first operating state.

Since when the operating element 30 is in the second operating state, an operating rotational speed of the motor 50 is lower than the maximum rotational speed the motor 50 can achieve, that is, the motor 50 works in the second working state, so the present application starts with the disclosure that the operating element 30 is in the second operating state. In a specific example, if the operating element 30 is in the second operating state, that is, when the motor 50 is in the second working state, a magnetic potential of the winding in the motor 50 is relatively strong and the rotational speed is at a normal level. Optionally, the power tool 100 may further have a speed regulation knob. When the operating element 30 is in the second operating state, that is, when the motor 50 is in the second working state, the user may adjust the speed appropriately through the speed regulation knob. It is to be noted that the rotational speed of the motor 50 in the second working state is always lower than the rotational speed of the motor 50 in the first working state. If the user presses the operating element 30 to switch the operating element 30 from the second operating state to the first operating state, the controller 60 may output a square wave or a quasi-square wave signal to control the driver circuit 40 to be turned on in a third conduction manner. In the present application, square wave signals shown in FIG. 3 are used as an example. When the operating element 30 is in the second operating state, the square wave signals outputted by the controller 60 are shown in FIG. 3A. Three phase windings A, B and C of the motor 50 perform commutation once every time the rotor rotates by 60°. When the operating element 30 is switched to the first operating state, the square wave signals are shown in FIG. 3B with the same commutation method, but the three phase windings have an advance angle during commutation, that is, the commutation is performed in advance. The advance angle reduces a magnetic potential of the winding to a certain extent, that is, the strength of the magnetic field of the winding in the motor 50 is weakened so that the rotational speed of the motor 50 can be quickly increased to the maximum rotational speed even if the power tool 100 is working in the Boost state.

Figure 4:
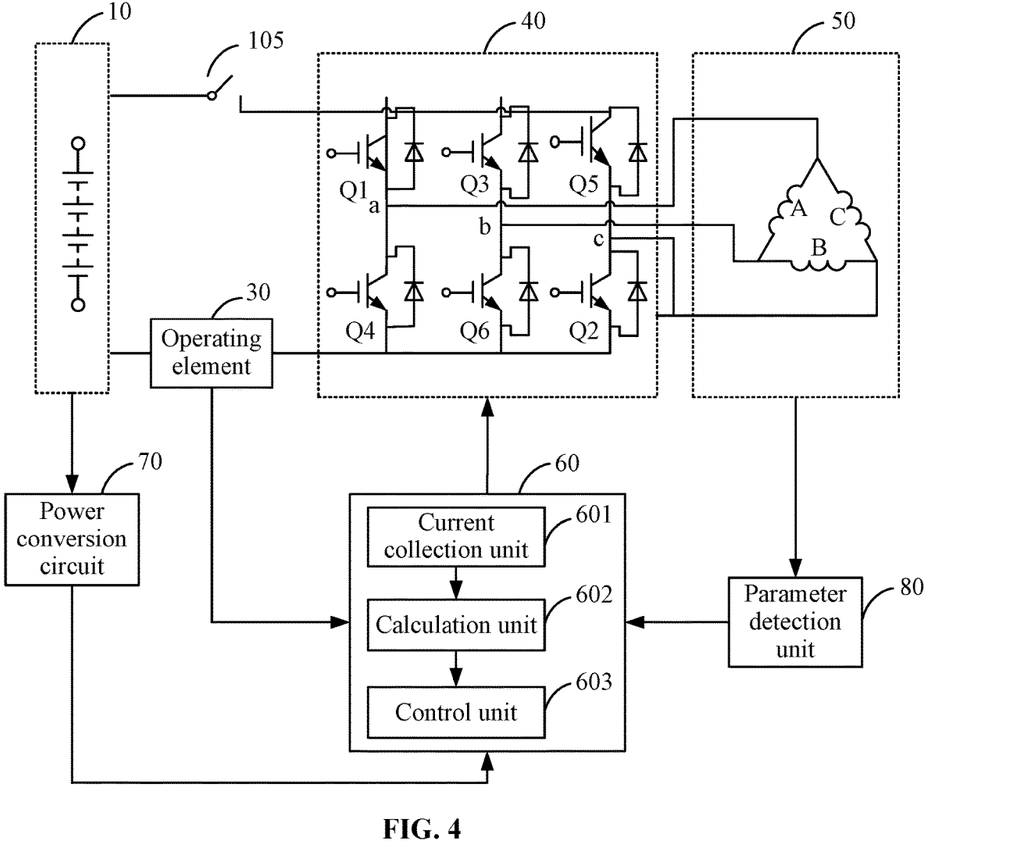
FIG. 4 is a circuit schematic of a power tool according to an example.

In an optional implementation manner, as shown in FIG. 4, the controller 60 includes a current collection unit 601, a calculation unit 602, and a control unit 603. if the user presses the operating element 30 to switch the operating element 30 from the second operating state to the first operating state, the current collection unit 601 in the controller 60 may collect the phase current of the motor 50, and the calculation unit 602 may perform calculation processing according to the phase current fed back by the motor 50 and a second target current that the motor 50 should have when the operating element 30 is in the first operating state, so as to obtain a second input current. The control unit 603 may use the second input current as a control signal to control the driver circuit 40 to be turned on in a fourth conduction state, thereby reducing the strength of the effective magnetic field of the winding in the motor and rapidly increasing the rotational speed of the motor to a target rotational speed in the Boost state.

In the present application, for a power tool with a maximum speed working mode, an effect of field weakening is achieved through square waves or current feedback, so as to ensure that the motor can quickly reach the target rotational speed, thereby avoiding a case where the rotational speed cannot be increased.

If the operating element 30 starts to be in the first operating state, that is, a Boost state, and the controller 60 detects that the operating element 30 is switched from the first operating state to the second operating state, conduction states of the power elements in the driver circuit 40 are controlled to change according to a preset control method, so as to enhance the strength of the effective magnetic field of the winding in the motor 50, thereby reducing the rotational speed of the motor 50. Optionally, the switching of the operating element 30 from the first operating state to the second operating state may be a state switching triggered by the user pressing the operating element 30 or the state switching automatically triggered by the power tool 100 for some reasons In an optional implementation manner, when the operating element 30 is switched from the first operating state to the second operating state, the controller 60 may output the square wave signal or the quasi-square wave signal to control the driver circuit 40 to be turned on in a first conduction manner, so as to reduce an electrical angle at which the winding is turned on and increase the strength of the effective magnetic field of the winding in the motor 50.

In an optional implementation manner, when the operating element 30 is switched from the first operating state to the second operating state, the current collection unit 601 in the controller 60 is configured to collect the phase current of the motor 50; the calculation unit 602 is configured to determine the first input current according to the phase current of the motor 50 and a first target current of the motor 50 when the operating element 30 in the second operating state; then, the control unit 603 controls the driver circuit 40 to be turned on in a second conduction manner based on the first input current, so as to increase the strength of the effective magnetic field of the winding in the motor 50.

It is to be understood that the strength of the magnetic field of the winding in the motor 50 is enhanced so that the effect of field weakening is achieved, thereby reducing the rotational speed of the motor 50.

In an example of the present application, no matter whether the operating element 30 is initially in the first operating state or is switched from the second operating state to the first operating state, it can be seen from the above that in the first operating state of the operating element 30, the motor 50 is in the first working state with the maximum rotational speed, the motor 50 has a high rotation speed and the temperature rises quickly, and the over-temperature protection is quickly triggered, thereby shutting down the motor 50. To maximize the total use time of the power tool 100, when the operating element 30 is in the first operating state, that is, when the motor 50 works in the first working state, the controller 60 may obtain a working parameter of the motor 50 detected by the parameter detection unit. If the working parameter is greater than or equal to a parameter threshold, the controller 60 outputs a square wave or a quasi-square wave signal to control the driver circuit 40 to be turned on in the first conduction manner, and the operating element 30 automatically jumps back to the second operating state, that is, the motor 50 automatically switches to the second working state.

When the power tool 100 is in a Boost state, the temperature of the motor 50 exceeds a temperature threshold, and the controller 60 controls the motor to automatically switch to a Normal state. Referring to the square wave signals shown in FIG. 3, when the operating element 30 is in the first operating state, the square wave signal has a certain advance angle as shown in FIG. 3B; when the operating element 30 is switched to the second operating state, the controller reduces the advance angle by outputting the square wave signals shown in FIG. 3A so that the effect of field weakening is reduced, that is, the strength of the effective magnetic field of the winding in the motor 50 is enhanced, thereby reducing the rotational speed of the motor 50.

In an optional implementation manner, when the operating element 30 is in the first operating state and the working parameter of the motor 50 is greater than or equal to the parameter threshold, the calculation unit 601 may determine the first input current according to the phase current of the motor 50 and the first target current that the motor should have when the operating element 30 is the second operating state. Further, the control unit 603 may control the driver circuit 40 to be turned on in the second conduction manner based on the first input current, so as to increase the strength of the effective magnetic field of the winding in the motor 50 and reduce the rotational speed of the motor 50 to a normal level.

Figure 5A:
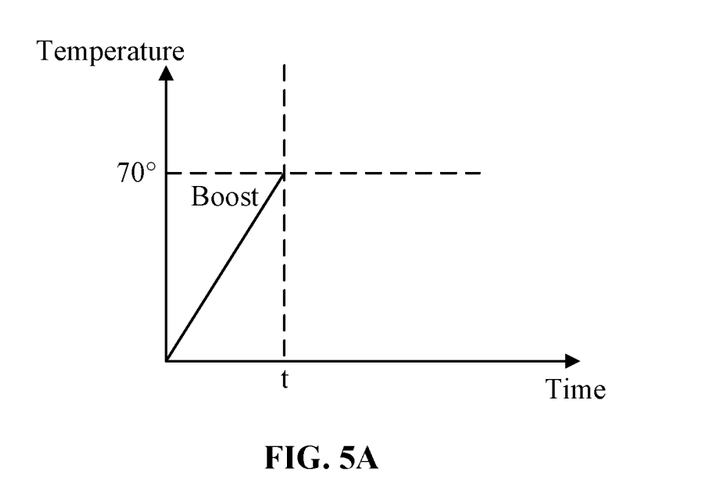
FIG. 5A is a temperature change curve of a motor according to an example in a prior art.
Figure 5B:
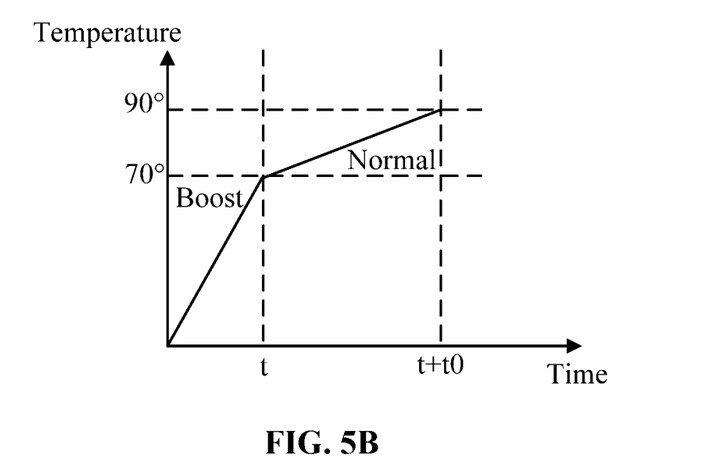
FIG. 5B is a temperature change curve of a motor according to an example in the present disclosure.

It is to be noted that the working parameter of the motor detected by the parameter detection unit is a temperature of the motor 50. The temperature threshold of over-temperature protection of the motor 20 in the first working state is T1 and the temperature threshold of over-temperature protection of the motor 50 in the second working state is T2, and T2>T1. That is, the cooling times of the power tool 100 after the over-temperature protection shutdown in the two states are different. In the present application, the temperature threshold at which the operating element 30 is automatically switched from the first operating state to the second operating state is set as the temperature threshold T1 of over-temperature protection of the motor 50 in the first working state. Exemplarily, referring to FIG. 5, the operating element 30 is in the first operating state, that is, the Boost state, the motor 50 rapidly heats up to the temperature threshold T1 (as shown in FIG. 5A, T1 is 70°), and then the power tool 100 can only be used again after being cooled for a relatively long time. Based on the solution in the present disclosure, if the operating element 30 is in the first operating state and the parameter detection unit detects that the temperature of the motor 50 reaches T1, the operating element 30 is controlled to jump back to the second operating state, that is, a Normal state, and the temperature of the motor 30 continues to rise to T2 (as shown in FIG. 5B, T2 is 90°) in the second working state, then the motor shuts down. Comparing FIGS. 5A with 5B, it can be seen that compared with the control of direct shutdown of the over-temperature protection in the Boost state, in the present application, the total working time of the power 100 tool increases by t0 when the power tool 100 switches from the Boost state to the Normal state, and the user experience is also improved.

In an example, the parameter detection unit may also detect relevant parameters of a control circuit board where a detection power supply 10 and/or the controller is located. For example, the parameter detection unit detects the temperature of the battery pack, the temperature of the circuit board, or the temperature of switch components on the circuit board. Therefore, the controller 60 may control the operating element to switch from the first operating state to the second operating state according to the temperature of the battery pack or the temperature of the circuit board. It is to be noted that, due to different detection objects, temperature thresholds at which the operating element is controlled to switch the operating states are also different and may be determined according to actual conditions, which are not described in detail here.

In another example of the present application, the operating element 30 has a first operating position and a second operating position, the controller can adjust the magnetic field of the winding in the motor through a preset adjustment method according to an operating position of the operating element, the operating element can be adjusted from the second operating position to the first operating position according to a triggering operation of the user, and the operating element may be controlled to automatically jump from the first operating position to the second operating position according to the temperature of the motor. For a specific control process, reference may be made to descriptions in the preceding examples, which are not repeated here.

It is to be noted that the preceding are only preferred examples of the present disclosure and technical principles used therein. It is to be understood by those skilled in the art that the present disclosure is not limited to the examples described herein. Those skilled in the art can make various apparent modifications, adaptations and substitutions without departing from the scope of the present disclosure. Therefore, while the present disclosure has been described in detail through the preceding examples, the present disclosure is not limited to the preceding examples and may include more other equivalent examples without departing from the concept of the present disclosure. The scope of the present disclosure is determined by the scope of the appended claims.

What is claimed is:

1. A power tool, comprising:
   a motor comprising a multi-phase winding;
   a power supply configured to power the motor;
   a switch configured to switch a power on-off state of the power tool;
   a driver circuit comprising a plurality of power elements and configured to change a rotational state of the motor;
   an operating element operable by a user having a first operating state and a second operating state, wherein a strength of an effective magnetic field of the multi-phase winding when the operating element is in the first operating state is less than a strength of an effective magnetic field of the multi-phase winding when the operating element is in the second operating state; and
   a controller connected to the motor and configured to control the rotational state of the motor,
   wherein the controller is configured to control conduction manners of the plurality of power elements in the driver circuit according to an operating state of the operating element, so as to adjust the strength of the effective magnetic field of the multi-phase winding to change the rotational state of the motor,
a rotational speed of the motor when the operating element is in the first operating state is greater than a rotational speed of the motor when the operating element is in the second operating state,
wherein the first operating state is a boost state, the second operating state is a normal state, the operating element comprises a boost key, and the boost key is configured to be operated by the user to switch the power tool between the normal state and the boost state, and
wherein the motor is in a first working state and has a maximum rotational speed when the operating element is in the first operating state and the motor is in a second working state and has a rotational speed less than the maximum rotational speed when the operating element is in the second operating state, a temperature threshold of over-temperature protection of the motor in the first working state is T1, a temperature threshold of over-temperature protection of the motor in the second working state is T2, and T2>T1.

2. The power tool of claim 1, wherein, when the operating element is switched from the first operating state to the second operating state, the controller changes conduction states of the plurality of power elements in the driver circuit based on a preset control method so as to enhance the strength of the effective magnetic field of the multi-phase winding.

3. The power tool of claim 2, wherein, when the operating element is switched from the first operating state to the second operating state, an output of the controller is a square wave signal or a quasi-square wave signal to control the driver circuit to be turned on in a first conduction manner so as to reduce an electrical angle at which the multi-phase winding is turned on and increase the strength of the effective magnetic field of the multi-phase winding.

4. The power tool of claim 2, wherein the controller comprises:
a current collection unit configured to collect a phase current of the motor;
a calculation unit configured to determine a first input current according to the phase current of the motor and a first target current of the motor when the operating element is in the second operating state; and
a control unit configured to, when the operating element is switched from the first operating state to the second operating state, control the driver circuit to be turned on in a second conduction manner based on the first input current so as to increase the strength of the effective magnetic field of the multi-phase winding.

5. The power tool of claim 4, wherein the calculation unit is further configured to determine a second input current according to the phase current of the motor and a second target current of the motor when the operating element is in the first operating state, and the control unit is further configured to control the driver circuit to be turned on in a fourth conduction manner based on the second input current to reduce the strength of the effective magnetic field of the multi-phase winding when the operating element is switched from the second operating state to the first operating state.

6. The power tool of claim 1, wherein, when the operating element is switched from the second operating state to the first operating state, the controller outputs a square wave signal or a quasi-square wave signal to control the driver circuit to be turned on in a third conduction manner so as to enhance an electrical angle at which the multi-phase winding is turned on and reduce the strength of the effective magnetic field of the multi-phase winding.

7. The power tool of claim 1, wherein the motor is a brushless motor.

8. The power tool of claim 1, wherein the motor is in a first working state and has a maximum rotational speed when the operating element is in the first operating state and the motor is in a second working state and has a rotational speed less than the maximum rotational speed when the operating element is in the second operating state.

9. The power tool of claim 8, wherein the power tool further comprises a parameter detection unit configured to detect a working parameter of the motor, and the controller controls the motor to automatically switch to the second working state when the operating element is in the first operating state and the working parameter is greater than or equal to a parameter threshold.

10. The power tool of claim 9, wherein, when the operating element is in the first operating state and the working parameter is greater than or equal to the parameter threshold, the controller outputs a square wave or a quasi-square wave signal to control the driver circuit to be turned on in a first conduction manner.

11. The power tool of claim 10, wherein the working parameter is a temperature of the motor.

12. The power tool of claim 9, wherein a temperature threshold of over-temperature protection of the motor in the first working state is T1, a temperature threshold of over-temperature protection of the motor in the second working state is T2, and T2>T1.

13. The power tool of claim 12, wherein the controller controls the motor to automatically switch to the second working state when the operating element is in the first operating state and the temperature of the motor is greater than or equal to a temperature threshold and the temperature threshold at which the motor is automatically switched from the first working state to the second working state is set as the temperature threshold T1 of over-temperature protection of the motor in the first working state.

14. The power tool of claim 12, wherein the controller controls the operating element to automatically switch to the second operating state when the operating element is in the first operating state and the temperature of the motor is greater than or equal to a temperature threshold.

15. A power tool, comprising:
a motor comprising a multi-phase winding;
a power supply configured to power the motor;
a switch configured to switch a power on-off state of the power tool;
a driver circuit having a plurality of power elements and configured to change a rotational state of the motor;
an operating element having a first operating position and a second operating position, wherein a strength of an effective magnetic field of the multi-phase winding of the motor when the operating element is in the first operating position is less than a strength of an effective magnetic field of the multi-phase winding of the motor when the operating element is in the second operating position; and
a controller connected to the motor and configured to control the rotational state of the motor;
wherein the controller is configured to control conduction manners of the plurality of power elements in the driver circuit according to an operating position of the operating element so as to adjust the strength of the effective magnetic field of the multi-phase winding and change the rotational state of the motor, a rotational speed of the motor when the operating element is in the first operating position is greater than a rotational speed of the motor when the operating element is in the second operating position, wherein the first operating state is a boost state, the second operating state is a normal state, the operating element comprises a boost key, and the boost key is configured to be operated by a user to switch the power tool between the normal state and the boost state, and wherein the motor is in a first working state and has a maximum rotational speed when the operating element is in the first operating state and the motor is in a second working state and has a rotational speed less than the maximum rotational speed when the operating element is in the second operating state, a temperature threshold of over-temperature protection of the motor in the first working state is T1, a temperature threshold of over-temperature protection of the motor in the second working state is T2, and T2>T1.

16. The power tool of claim 15, wherein the controller is configured to, when the operating element is switched from the first operating position to the second operating position, change conduction states of the plurality of power elements in the driver circuit based on a preset control method so as to enhance the strength of the effective magnetic field of the multi-phase winding.

17. The power tool of claim 16, wherein the controller is configured to, when the operating element is switched from the first operating position to the second operating position, output a square wave signal or a quasi-square wave signal to control the driver circuit to be turned on in a first conduction manner so as to reduce an electrical angle at which the multi-phase winding is turned on and increase the strength of the effective magnetic field of the multi-phase winding.

18. The power tool of claim 15, wherein the motor is a brushless motor.

* * * * *